Aug. 11, 1936.  E. T. DAHL  2,050,279
CONTROL MECHANISM
Filed Sept. 29, 1932  2 Sheets-Sheet 1

Inventor:
Edward T. Dahl
By Macleod, Calver, Copeland & Dike
Attorneys

Aug. 11, 1936.  E. T. DAHL  2,050,279
CONTROL MECHANISM
Filed Sept. 29, 1932   2 Sheets-Sheet 2
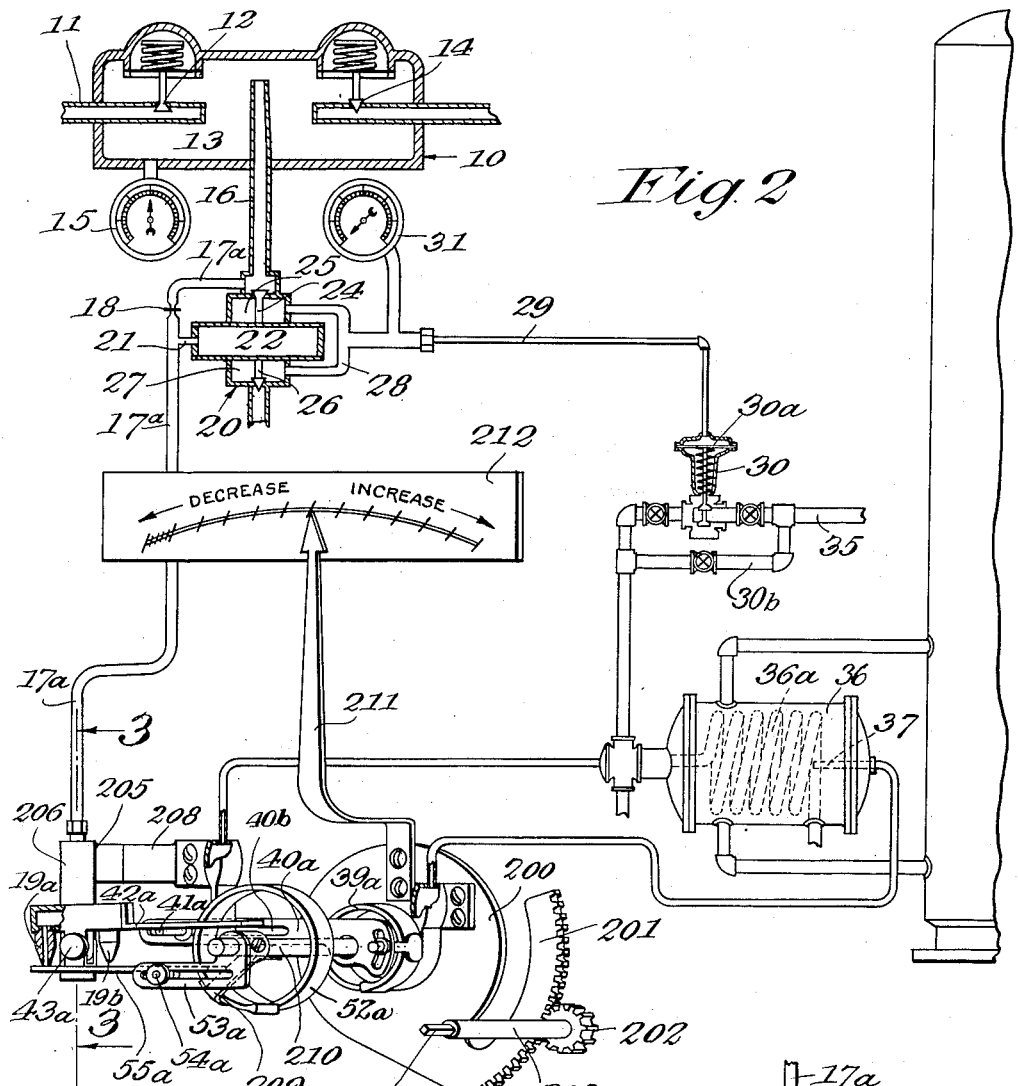
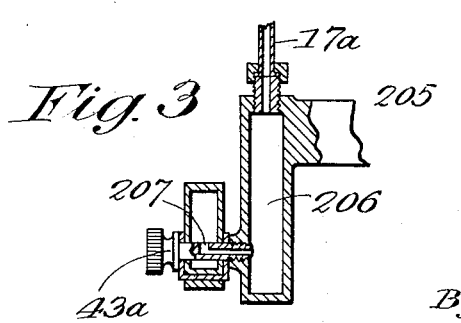
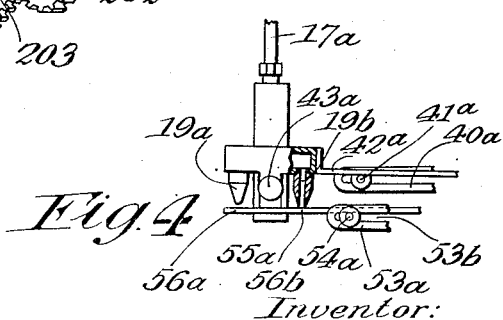
Inventor:
Edward T. Dahl
By Macleod Cahn Copeland Sly
Attorneys Patented Aug. 11, 1936

2,050,279

UNITED STATES PATENT OFFICE 2,050,279

CONTROL MECHANISM

Edward T. Dahl, Randolph, Mass., assignor, by mesne assignments, to Eldon Macleod, Westwood, Mass., Frank A. Morrison, Newton, Mass., Cameron Macleod, Berwyn, Pa., Leslie Soule, Dedham, Mass., and Sullivan A. Sargent, Jr., Needham, Mass., trustees doing business as Mason-Neilan Regulator Company, Boston, Mass.

Application September 29, 1932, Serial No. 635,356

11 Claims. (Cl. 236—18)

This invention relates to a control mechanism and particularly to a dual control mechanism which operates by controlling a variable characteristic of a processed medium by changes in characteristics of both the processed and the processing media.

Heretofore, control instruments have taken their control from a variable characteristic of the medium being processed or controlled such as its temperature. But such control is inaccurate and unsatisfactory except under the most ideal conditions. Any attempt of the instrument to check a variation in temperature usually sends the controlled temperature an equal amount in the opposite direction. This is known as "hunting" and is a common defect in most control mechanisms.

I have found that much of the fluctuation in temperature, for instance, in the controlled medium is due to previous fluctuations in the controlling medium. I, therefore, realized that if the fluctuations in the controlling medium could be anticipated before the controlled medium was affected thereby, a more accurate control over the controlled medium could be obtained. I have accordingly devised this dual control mechanism.

The chief idea of this method of control is to place an instrument in the processing medium which is responsive to changes in a variable characteristic, in addition to the customary instrument placed in the medium being processed, and getting the ultimate control as the result of the interaction of these two instruments, instead of from one instrument as previously. In other words, my mechanism contemplates controlling the flow of what may be termed the controlling or processing medium, such as steam, fuel, or even air for combustion, by a valve which is itself controlled by the joint or resultant action of two instruments, one of which is responsive to changes in a variable characteristic of the processing medium and the other to changes in a characteristic of the processed medium. In this way an entirely accurate control is achieved because fluctuations in the processing medium are anticipated and corrected before, instead of after, they have caused fluctuations in the medium being processed. The variable characteristics need not be the same, as for instance, two temperatures and pressures, but can be in various combinations, as temperature and pressure, temperature and volume, rate of flow and pressure, etc.

This method of dual control is applicable to many fields where various types of control are desired, and I have devised a number of installations which are modifications of this basic principle of control and which are covered in separate applications for patent. As an example of my invention I have shown herein a method of temperature control in a steam-heated installation. It comprises briefly a tank for containing raw gasoline or other substance to be thermally controlled and a pipe or steam coil in the tank for heating the gasoline. A control valve on the steam line controls the admission of steam to the coil in the tank. A temperature responsive instrument or thermostat in the gasoline tank is connected to a coil, and a pressure responsive device in the steam line below the control valve is connected to a second coil. The coils operate jointly to move the flapper and exhaust orifice of a pilot valve mechanism operated by an independent pressure system which independent pressure in turn operates the control valve on the steam supply line. One coil is attached to the orifice of the pilot mechanism and the other to the flapper and both operate through interacting levers. By this arrangement of the flapper, orifice and levers, a range of proportions and ratios of as much as 100 to 1 can be obtained merely by changing the coils and the length of the levers.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings:

Fig. 2 is a diagrammatic view of a slightly modified mechanism;

Fig. 3 is a sectional view on line 3—3 of Fig. 2 showing a construction of the exhausting orifice; and Fig. 4 is a front elevational view partly in section of the exhausting orifice and cooperating flapper of Fig. 2.

Figure 1:
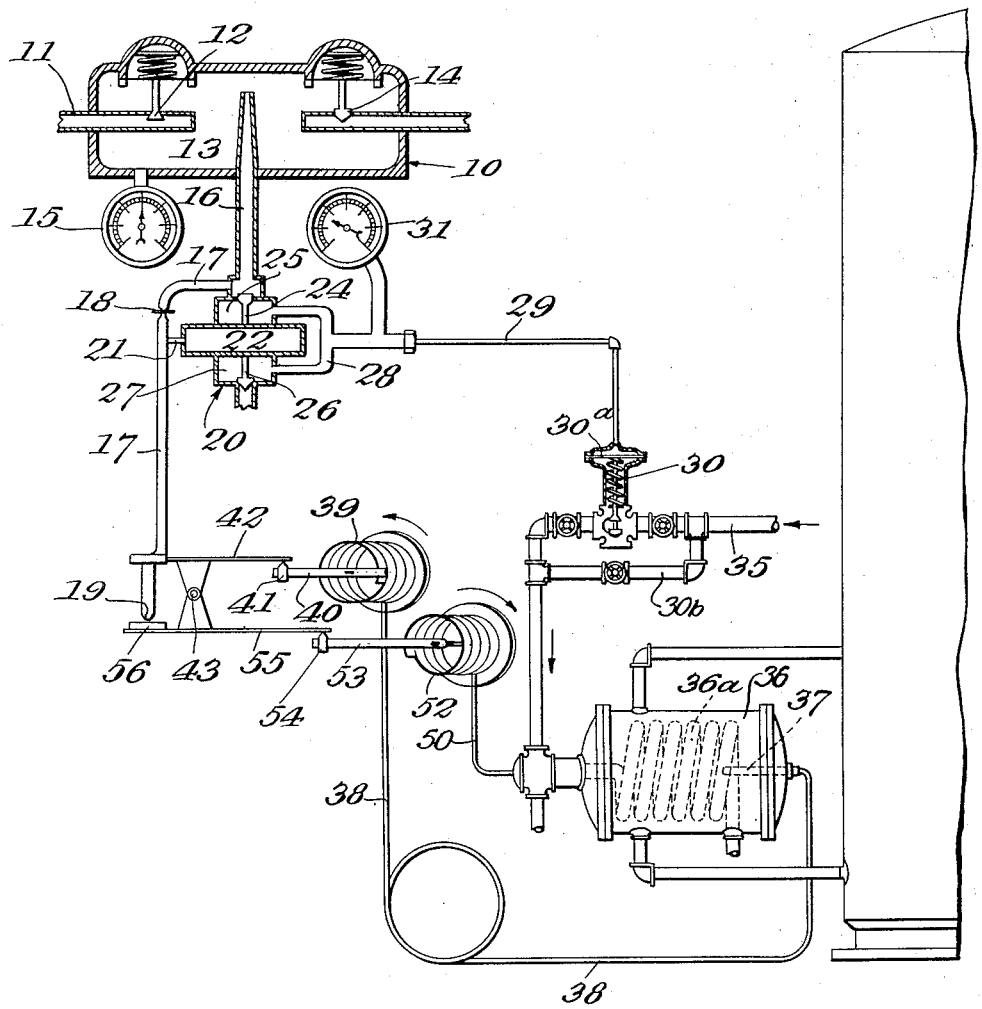
Fig. 1 is a diagrammatic view of my dual control mechanism as adapted for temperature control in a steam heated installation.

In Fig. 1, 10 represents a mechanism for maintaining an adequate and constant pressure of air or other gas for operating the independent pressure system to be later described. The air or gas is supplied through pipe 11 and passes into the reservoir 13 through reducing valve 12, which is preferably set for 15 pounds pressure. A safety relief valve 14 is likewise provided in the mechanism 10, again preferably set for 15 pounds pressure and if pressure in the reservoir 13 exceeds 15 pounds as indicated by gauge 15 the relief valve 14 opens and permits air to escape until the pressure is reduced. The air from reservoir 13 passes down the pipe 16 leading to a diaphragm mechanism 20. A flexible branch pipe 17 having a fixed orifice 18 bypasses the stream of air and ordinarily exhausts it to the atmosphere through exhaust orifice 19 at the lower end of the branch pipe 17. A flapper 56 as actuated by the pressure in the heating medium, later described, operates to close the exhaust orifice 19 and thereby build up pressure in branch pipe 17 below the fixed orifice 18.

Branch pipe 17 connects with the diaphragm mechanism 20 through pipe 21 below the fixed orifice 18 which leads into a central diaphragm chamber 22. A stem 24 abutting the top side of the diaphragm chamber 22 forms a valve between pipe 16 and chamber 25. A similar stem 26 abutting the bottom side of the diaphragm chamber 22 forms an exhaust valve between the chamber 27 and the atmosphere. Both chambers are connected on the outside by pipe 28 which leads through pipe 29 to the control valve 30. A by-pass 30b may be provided for valve 30 as shown. A gauge 31 is connected to pipe 29 and records the pressure in said pipe. Control valve 30, which is preferably a diaphragm motor valve, controls the admission of steam or other heating medium to the heating tank 36.

On the closing of exhaust orifice 19, pressure in diaphragm chamber 22 builds up, forcing valve 26 closed and valve 24 open, allowing pressure from pipe 16 to enter directly into chamber 25, flow through connecting pipe 28 into chamber 27 and equalize the pressures therein. When pressure in chamber 25 balances the force in central chamber 22, valve 24 closes to prevent pressure in 25 from increasing. Air then flows through pipes 28 and 29 to control valve 30, the pressure of which on the diaphragm 30a opens the valve 30 and permits the heating medium to flow into the heating tank 36.

Steam or other heating medium is supplied to the heating vessel 36 through pipe 35, the steam flowing through coils 36a arranged therein. In the vessel 36 is the raw gasoline or other substance being thermally controlled. A thermostat 37 or other temperature responsive instrument containing an expansible fluid is provided in the vessel 36 and connects through pipe 38 to the coil 39 rigidly fixed at one end. The coil 39 may be helical, spiral, or a segment of a Bourdon tube or other device responsive to pressure (i. e., pressure responsive when thermostat 37 contains an expansible fluid). To the other end of the tube 39 is rigidly attached an arm 40 with sliding wedge 41 thereon in abutting relation to one end of lever 42 which is fulcrumed at 43 and is rigidly attached at its other end to the exhaust orifice 19. The position of wedge 41 on arm 40 is adjustable to provide various ranges of control. Therefore, as the temperature in vessel 36 rises, the expanding fluid in the thermostat 37 increases its pressure and tends to unwind helical coil 39 which acting through arm 40 lowers wedge 41 and causes lever 42 to rock on fulcrum 43 and elevate orifice 19 so as to partially open it. This reduces the pressure on diaphragm 30a and control valve 30 partially closes. This decreases the flow of heating medium through pipe 35 and further temperature rise at thermostat 37 is prevented. A variation in pressure (as induced by rate of flow condensation, absorption of heat, quality of steam, or change of upstream pressure above control valve 30) in the heating medium causes a corresponding change in the temperature of the controlled medium. Accordingly, a pressure responsive instrument 50 (which may be merely a connection which transmits the original pressure of the heating medium) is placed in the steam supply line 35 between the motor valve 30 and the vessel 36, and connects with the second helical coil 52 or other Bourdon tube or pressure responsive device, again rigidly fixed at one end. To the other end again is rigidly attached an arm 53 with sliding wedge 54 thereon in abutting relation to lever 55 also fulcrumed at point 43. At the further end of lever 55 is attached the flapper 56 for closing the exhaust orifice 19. Again, as pressure of the steam or other heating medium tends to decrease, this is transmitted to the pressure coil 52 which winds up, allowing the wedge 54 to tilt lever 55 downward on fulcrum 43, elevating flapper end 56 and partially closing orifice 19 which in turn allows control valve 30 to open partially, thereby increasing the flow of heating medium. As the temperature at the thermostat 37 tends to decrease, coil 39 winds up and tips lever 42, so as to tend to close orifice 19. This increase of pressure on the diaphragm 30a opens valve 30 and permits a slight additional flow of heating medium so as to maintain a constant temperature. Similarly any tendency toward an increase in pressure of the heating medium unwinds coil 52 and through lever 55 lowers flapper 56, partially opening orifice 19 and closing control valve 30, and permitting lesser flow of the heating medium.

Thus fluctuations in pressure of the heating medium are controlled and compensated for through the independent pressure system operating on the motor valve 30 before they have affected the temperature of the controlled medium in vessel 36. Thus the temperature of the controlled medium is governed by the joint and resultant action of two instruments, one responsive to changes in temperature of the controlled medium and the other responsive to pressure in the controlling or heating medium.

In Figs. 2, 3 and 4, I have shown a slightly modified form of my mechanism, as adapted for actual operation. The principle of operation is the same but the control instruments and parts comprising the exhaust valve of the independent pressure system are different in details. An adjusting disk 200, rotatably mounted on shaft 210, is provided, having the pinion segment 201 operated by gear 202 as rotated through the rod 203 rigidly secured thereto. The top end 204 of rod 203 is formed to receive a key (not shown) for changing the position of adjusting disk 200. The temperature coil 39a is rigidly secured to the disk 200 at its bottom end and at its free end is attached to arm 40a having wedge or pin 41a slidable therealong in slot 40b, whereby the position of wedge 41a is adjustable with respect to arm 40a. Sliding wedge 41a is in abutting relation to one end of lever 42a fulcrumed about the pivot 43a and at its other end carrying exhaust nozzle 19a. Exhaust nozzle 19b is provided on lever 42a on the other side of pivot 43a from the orifice 19a, for the purpose of providing adjustability in my mechanism. But only one exhaust orifice 19a or 19b, is used at one time and the one not in use (19b in Fig. 2) is plugged in any suitable manner as by solder. In this way, if in the field an installation is found with a control valve setting opposite to the control valve 30 of Fig. 1 or 2, the exhaust port 19b may be used and exhaust port 19a plugged up. This provides an opposite control without changing the setting of the control valve, as can be readily understood.

The branch pipe 17a is supported at its lower end by a rigid member 205, having a chamber 206 (Fig. 3) therein into which branch pipe 17a discharges. The chamber 206 is ported through hollow pivot shaft 43a, which has a port 207 leading into exhaust nozzle 19a, or 19b as the case may be. It will be seen therefore that lever 42a is free to rock on pivot 43a and that the independent pressure system exhausts through branch pipe 17a, chamber 206, port 207 in pivot 43a and thence through exhaust nozzle 19a or 19b. Also suspended on pivot 43a is the lever 55a having flapper portions 56a and 56b.

A lateral extension 208 (Fig. 2) from the rigid member 205 rigidly supports the pressure coil 52a at its bottom end, and it will be noted that coil 52a is arranged in concentric alinement with temperature coil 39a, although the concentric alinement, is not necessary for its operation. The free end of pressure coil 52a is rigidly connected through arm 209 to the central shaft 210, on which disk 200 rotates, and arm 53a is rigidly mounted on central shaft 210 and moves therewith. Arm 53a carries sliding wedge 54a thereon, being slidable along slot 53b for adjustability. Sliding wedge 54a is placed in abutting relation to one end of lever 55a, which is likewise pivoted on pivot 43a with lever 42a. It will be seen therefore that as pressure coil 52a tends to wind or unwind in response to pressure changes it carries with it central shaft 210 and arm 53a which in turn moves lever 55a and flapper portion 56a (or 56b) toward or away from exhaust nozzle 19a (or 19b) as the case may be. Central shaft 210 at its outer end is journaled in a bearing on a rigid framework which also supports disk 200, but not shown in the drawings for the sake of clarity.

The pointer 211 is also rigidly secured to disk 200 and moves therewith in relation to a scale marked on plate 212. The scale lines marked on plate 212 indicate temperature, and the mechanism is set to operate at different temperatures by merely adjusting the setting of disk 200 which carries with it temperature coil 39a, by means of a key, not shown, which rotates the rod 203 and gear 202. Thus, if a temperature of 200° F., for instance, is desired to be maintained in the medium being processed, the indicator or pointer 211 is set at a point representing 200° F., on the scale marked on plate 212, and the instrument will not begin to control until a temperature of 200° is reached.

In Fig. 4 is shown a detail of the exhaust valve with the exhaust nozzle 19b in use, as shown by the cross section. In this case the exhaust nozzle 19a in Fig. 4 is plugged up and not in use.

I claim:—

1. A control mechanism of the class described, comprising a medium to be controlled, a second medium in controlling relationship thereto, a control valve governing the supply of said second medium, a pilot mechanism utilizing an independent pressure system for operating said control valve and ordinarily exhausting to the atmosphere, an exhaust valve governing the exhaust from said system, said pilot mechanism including a casing, a pair of diaphragms dividing said casing into two outer chambers and an inner chamber, a supply valve and a waste valve in said outer chambers governing the supply and waste of pressure in said system, said pressure expanding said inner chamber and actuating said supply and waste valves to divert said pressure to the control valve for operating the same on the closing of said exhaust valve, and joint means responsive to a variable characteristic in each medium for actuating said exhaust valve through the resultant action of said characteristics.

2. A control mechanism of the class described, comprising a medium to be controlled, a second medium in controlling relationship thereto, a control valve governing the supply of said second medium, a pilot mechanism utilizing an independent pressure system for operating said control valve and ordinarily exhausting to the atmosphere, an exhaust valve governing the exhaust from said system, said pilot mechanism including a casing, a pair of diaphragms dividing said casing into two outer chambers and an inner chamber, a supply valve and a waste valve in said outer chambers governing the supply and waste of pressure in said system, said pressure expanding said inner chamber and actuating said supply and waste valves to divert said pressure to the control valve for operating the same on the closing of said exhaust valve, an instrument responsive to a variable characteristic in the controlling medium, another instrument responsive to a variable characteristic of the controlled medium, and joint means operated by the resultant action of said instruments for actuating the exhaust valve of the independent pressure system.

3. A thermal control mechanism, comprising a medium to be thermally controlled, a second medium in thermally controlling relationship thereto, a control valve governing the supply of said second medium, a pilot mechanism utilizing an independent source of pressure for operating said control valve and ordinarily exhausting to the atmosphere, an exhaust valve governing the exhaust from said pilot mechanism, said pilot mechanism including a casing, a pair of diaphragms dividing said casing into two outer chambers and an inner chamber, a supply valve and a waste valve in said outer chambers governing the supply and waste of pressure in said system, said pressure expanding said inner chamber and actuating said supply and waste valves to divert said pressure to the control valve for operating the same on the closing of said exhaust valve, and means responsive to the resultant effect of temperature of the controlled medium and of the pressure of the controlling medium for actuating said exhaust vlave.

4. A thermal control mechanism, comprising a medium to be thermally controlled, a second medium in thermally controlling relationship thereto, a control valve governing the supply of said second medium, a pilot mechanism utilizing the independent pressure system for operating said control valve and ordinarily exhausting to the atmosphere, an exhaust valve governing the exhaust from said system, said pilot mechanism including a casing, a pair of diaphragms dividing said casing into two outer chambers and an inner chamber, a supply valve and a waste valve in said outer chambers governing the supply and waste of pressure in said system, said pressure expanding said inner chamber and actuating said supply and waste valves to divert said pressure to the control valve for operating the same on the closing of said exhaust valve, and joint means responsive to the temperature of the controlled medium and the pressure of the controlling medium for actuating said exhaust valve through the resultant action of said temperature and pressure.

5. A thermal control mechanism comprising a medium to be thermally controlled, a second medium in thermally controlling relationship thereto, a control valve governing the supply of said second medium, a pilot mechanism utilizing an independent source of pressure for operating said control valve and ordinarily exhausting to the atmosphere, an exhaust valve governing the exhaust from said pilot mechanism, said pilot mechanism including a casing, a pair of diaphragms dividing said casing into two outer chambers and an inner chamber, a supply valve and a waste valve in said outer chambers governing the supply and waste of pressure in said system, said pressure expanding said inner chamber and actuating said supply and waste valves to divert said pressure to the control valve for operating the same on the closing of said exhaust valve, an instrument responsive to the temperature of the controlled medium, another instrument responsive to the pressure of the controlling medium, and joint means operated by the resultant action of said instruments for actuating the exhaust valve of the independent pressure system.

6. A thermal control mechanism comprising a medium to be thermally controlled, a second medium in thermally controlling relationship thereto, a control valve governing the supply of said second medium, a pilot mechanism utilizing an independent source of pressure for operating said control valve and ordinarily exhausting to the atmosphere, an exhaust valve governing the exhaust from said pilot mechanism, comprising a movable orifice and flapper, levers for moving said orifice and flapper toward and away from each other and operating said exhaust valve, an instrument responsive to the temperature of the controlled medium, another instrument responsive to the pressure of the controlling medium, a coil actuated by the temperature responsive instrument for moving the orifice lever, another coil actuated by the pressure responsive instrument for moving the flapper lever, and so actuating the exhaust valve of the independent pressure system through the resultant action of said instruments.

7. A control mechanism of the class described, comprising a medium to be controlled, a second medium in controlling relationship thereto, a control valve governing the supply of said second medium, a pilot mechanism utilizing an independent source of air pressure for operating said control valve and ordinarily exhausting to the atmosphere, an exhaust valve governing the exhaust of said air pressure to the atmosphere, said pilot mechanism including a casing, a pair of diaphragms dividing said casing into two outer chambers and an inner chamber, a supply valve and a waste valve in said outer chambers governing the supply and waste of pressure in said system, said pressure expanding said inner chamber and actuating said supply and waste valves to divert said pressure to the control valve for operating the same on the closing of said exhaust valve, and joint means responsive to changes in a variable characteristic in each medium for actuating said exhaust valve through the resultant action of said characteristics.

8. A control mechanism of the class described, comprising a medium to be controlled, a second medium in controlling relationship thereto, a control valve governing the supply of said second medium, a pilot mechanism utilizing an independent source of air pressure for operating said control valve and ordinarily exhausting to the atmosphere, an exhaust valve governing the exhaust of said air pressure to the atmosphere, said pilot mechanism including a casing, a pair of diaphragms dividing said casing into two outer chambers and an inner chamber, a supply valve and a waste valve in said outer chambers governing the supply and waste of pressure in said system, said pressure expanding said inner chamber and actuating said supply and waste valves to divert said pressure to the control valve for operating the same on the closing of said exhaust valve, an instrument responsive to a variable characteristic in the controlling medium, another instrument responsive to a variable characteristic of the controlled medium, and joint means operated by the resultant action of said instruments for actuating the exhaust valve of the independent air pressure system.

9. A thermal control mechanism comprising a medium to be thermally controlled, a second medium in thermally controlling relationship thereto, a control valve governing the supply of said second medium, a pilot mechanism utilizing an independent source of pressure for operating said control valve ordinarily exhausting to the atmosphere, an exhaust valve governing the exhaust of said pressure to the atmosphere, said pilot mechanism including a casing, a pair of diaphragms dividing said casing into two outer chambers and an inner chamber, a supply valve and a waste valve in said outer chambers governing the supply and waste of pressure in said system, said pressure expanding said inner chamber and actuating said supply and waste valves to divert said pressure to the control valve for operating the same on the closing of said exhaust valve, and joint means responsive to the resultant effect of the temperature of the pressure of the controlling medium for actuating said exhaust valve.

10. A thermal control mechanism comprising a medium to be thermally controlled, a second medium in thermally controlling relationship thereto, a control valve governing the supply of said second medium, a pilot mechanism utilizing an independent source of pressure for operating said control valve ordinarily exhausting to the atmosphere, an exhaust valve governing the exhaust of said pressure to the atmosphere, said pilot mechanism including a casing, a pair of diaphragms dividing said casing into two outer chambers and an inner chamber, a supply valve and a waste valve in said outer chambers governing the supply and waste of pressure in said system, said pressure expanding said inner chamber and actuating said supply and waste valves to divert said pressure to the control valve for operating the same on the closing of said exhaust valve, an instrument responsive to the temperature of the controlled medium, another instrument responsive to the pressure of the controlling medium, and joint means operated by the resultant action of said instruments for actuating the exhaust valve in the pilot mechanism.

11. A thermal control mechanism comprising a medium to be thermally controlled, a second medium in thermally controlling relationship thereto, a control valve governing the supply of said second medium, a pilot mechanism utilizing an independent source of pressure for operating said control valve ordinarily exhausting to the atmosphere, an exhaust valve governing the exhaust of said pressure to the atmosphere including an orifice and flapper, a supply and waste valve in said pilot mechanism for supplying and wasting pressure to and from said control valve, a diaphragm chamber in said pilot mechanism acted on by said pressure for actuating the supply and waste valve, levers for moving said orifice and flapper toward and away from each other and operating said exhaust valve, an instrument responsive to the temperature of the controlled medium, another instrument responsive to the pressure of the controlling medium, a coil actuated by the temperature responsive instrument for moving the orifice lever, another coil actuated by the pressure responsive instrument for moving the flapper lever, and so actuating the exhaust valve of the independent pressure system through the resultant action of said instruments.

EDWARD T. DAHL.